(12) United States Patent
Sieckowski et al.

(10) Patent No.: US 11,562,163 B1
(45) Date of Patent: Jan. 24, 2023

(54) BARCODE READER AND BARCODE READER ASSEMBLY WITH LIFT HANDLES

(71) Applicant: ZEBRA TECHNOLOGIES CORPORATION, Lincolnshire, IL (US)

(72) Inventors: Steven D. Sieckowski, Port Jefferson, NY (US); Benjamin H. Stibal, Patchogue, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 38 days.

(21) Appl. No.: 17/363,992

(22) Filed: Jun. 30, 2021

(51) Int. Cl.
*G06K 7/10* (2006.01)
(52) U.S. Cl.
CPC ......... *G06K 7/1098* (2013.01); *G06K 7/1096* (2013.01); *G06K 7/10722* (2013.01); *G06K 7/10831* (2013.01); *G06K 7/10861* (2013.01)
(58) Field of Classification Search
CPC ........................... G06K 7/1096; G06K 7/1098

USPC .................................................... 235/462.43
See application file for complete search history.

(56) References Cited

U.S. PATENT DOCUMENTS 9,155,406 B1 \* 10/2015 Whiteside ............... A47F 9/046

\* cited by examiner

*Primary Examiner* — Toan C Ly
(74) *Attorney, Agent, or Firm* — Yuri Astvatsaturov

(57) ABSTRACT

Barcode readers and barcode reader assemblies with lift handles are disclosed herein. An example bioptic barcode reader assembly includes a barcode reader having a housing and a metal frame secured to the housing. A retractable first lift handle having an elongated first aperture is positioned on a first side of the housing and a retractable second lift handle having an elongated second aperture is positioned on a second side of the housing, opposite the first side. Each of the first and second lift handles is movable relative to the housing between a retracted position and an extended position and the first and second apertures in the first and second lift handles overlie a first center of gravity of the barcode reader and a second center of gravity of the barcode reader assembly.

26 Claims, 12 Drawing Sheets

BARCODE READER AND BARCODE READER ASSEMBLY WITH LIFT HANDLES

BACKGROUND

Barcode readers and barcode reader assemblies, with metal frames and/or scale assemblies, can be difficult to move, maneuver, install and uninstall because of the size and weight of the unit/assembly. For example, attempting to lift and install a barcode reader assembly into a piece of furniture, such as a countertop at a retail location can be difficult because of the minimal clearances between the barcode reader/assembly and the opening in which is it being installed. This is further complicated by the variety of barcode reader assemblies that can be available. For example, barcode reader assemblies can have different size frames (short, medium, long, etc.) and can come with or without a scale assemblies. All of these different versions change the weight and center of gravity of the assembly and can make lifting and balancing the assembly difficult.

There are some barcode readers and barcode reader assemblies that have attempted to address this issue by providing a lift mechanism that includes a small hook that can rotate between a retracted and extended position and be used to assist in lifting and moving the barcode reader/ assembly. However, these lift mechanisms are only large enough to fit a single finger, which does not provide much assistance when lifting a heavier assembly with a metal frame and/or a scale assembly. In addition, since these lift mechanisms are narrow, the area covered by the hook is small and will not be located over the center of gravity of the barcode reader and the barcode reader assembly with a variety of options, which does not help in keeping the barcode reader/assembly balanced when lifted or moved or during installation.

SUMMARY

In an embodiment, the present invention is a barcode reader assembly comprising a barcode reader and a metal frame. The barcode reader comprises a housing, a retractable first lift handle having an elongated first aperture positioned on a first side of the housing, and a retractable second lift handle having an elongated second aperture positioned on a second side of the housing, opposite the first side. Each of the first lift handle and the second lift handle are movable relative to the housing between a retracted position and an extended position. The metal frame is secured to the housing of the barcode reader. The first and second apertures in the first and second lift handles overlie a first center of gravity of the barcode reader and a second center of gravity of the barcode reader assembly.

In a variation of this embodiment, the barcode reader assembly comprises a scale assembly positioned between the barcode reader and the metal frame.

In another embodiment, the present invention is a bioptic barcode reader comprising a housing, a retractable first lift handle positioned on a first side of the housing, and a retractable second lift handle positioned on a second side of the housing, opposite the first side. The first lift handle has an elongated first aperture and is movable in a linear motion relative to the housing between a retracted position and an extended position. The second lift handle has an elongated second aperture and is movable in a linear motion relative to the housing between the retracted position and the extended position.

In another embodiment, the present invention is a method of moving a barcode reader, comprising the steps of: moving a retractable first lift handle, positioned on a first side of a housing of a barcode reader of the barcode reader assembly, in a linear motion relative to the housing from a retracted position to an extended position; moving a retractable second lift handle, positioned on a second side of the housing of the barcode reader, opposite the first side, in a linear motion relative to the housing from the retracted position to the extended position; gripping the first lift handle via an elongated first aperture in the first lift handle and the second lift handle via an elongated second aperture in the second lift handle; and lifting the barcode reader assembly via the first lift handle and the second lift handle.

In a variation of this embodiment, the barcode reader assembly comprises a metal frame secured to the housing of the barcode reader and the first and second apertures in the first and second lift handles overlie a first center of gravity of the barcode reader and a second center of gravity of the barcode reader assembly.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
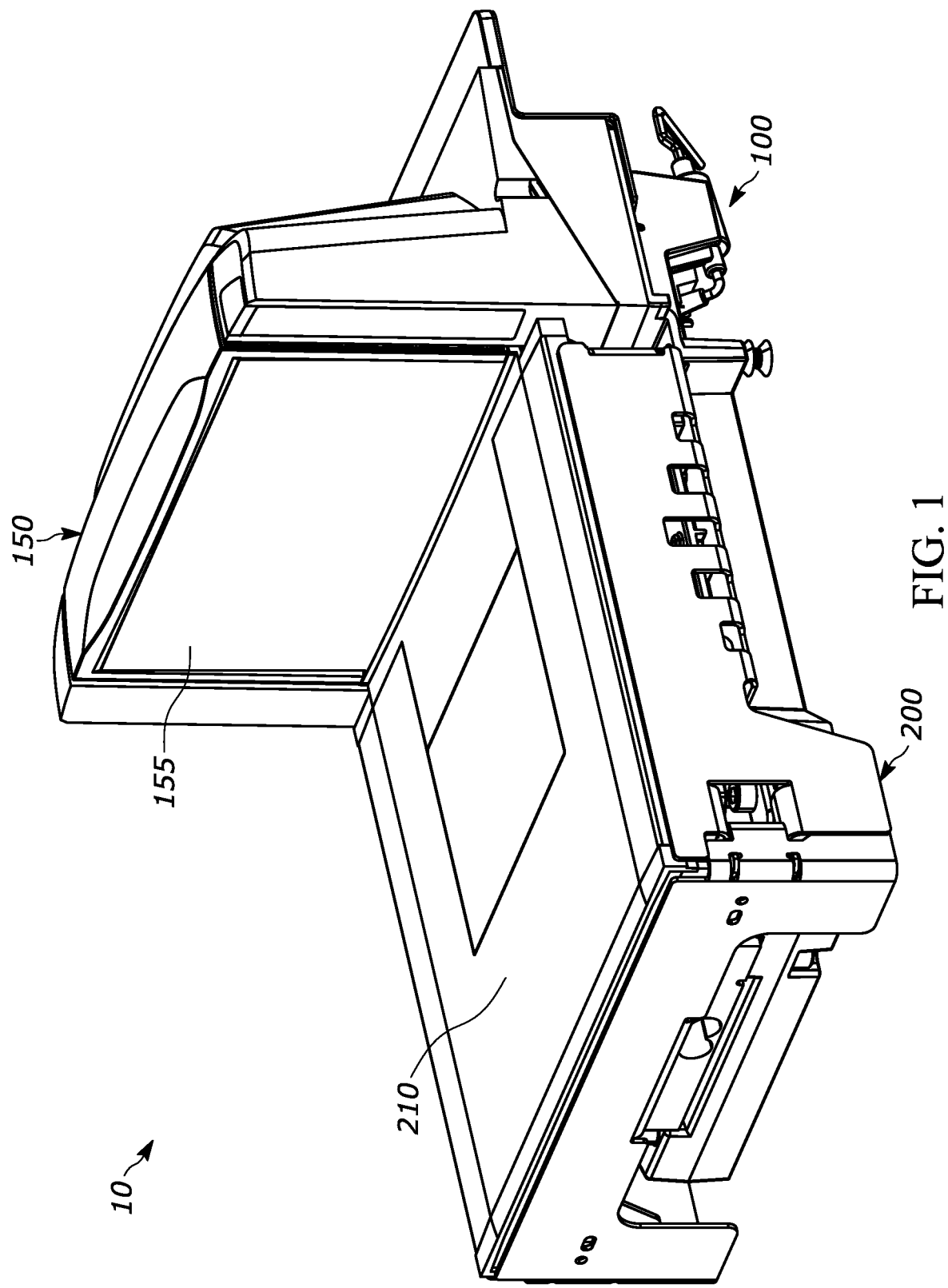
FIG. 1 illustrates a perspective view of an example barcode reader assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The examples disclosed herein relate to barcode readers and barcode reader assemblies that have internal lift handles located under the platter of the barcode reader assembly that can be used to lift and move the barcode reader and/or barcode reader assemblies, for example, to install or remove the barcode reader and/or barcode reader assembly from furniture. The example barcode readers/barcode reader assemblies have two handles with elongated apertures that are preferably large enough to engage a full hand and can move vertically in a linear motion between retracted and extended positions. The large grip area provided by the elongated apertures allows a user to adjust their grip location and are positioned over a center of gravity of the barcode reader and the barcode reader assembly (scale and no scale versions) to keep the barcode reader and barcode reader assembly balanced, which facilitates a more ergonomic installation experience.

Figure 2:
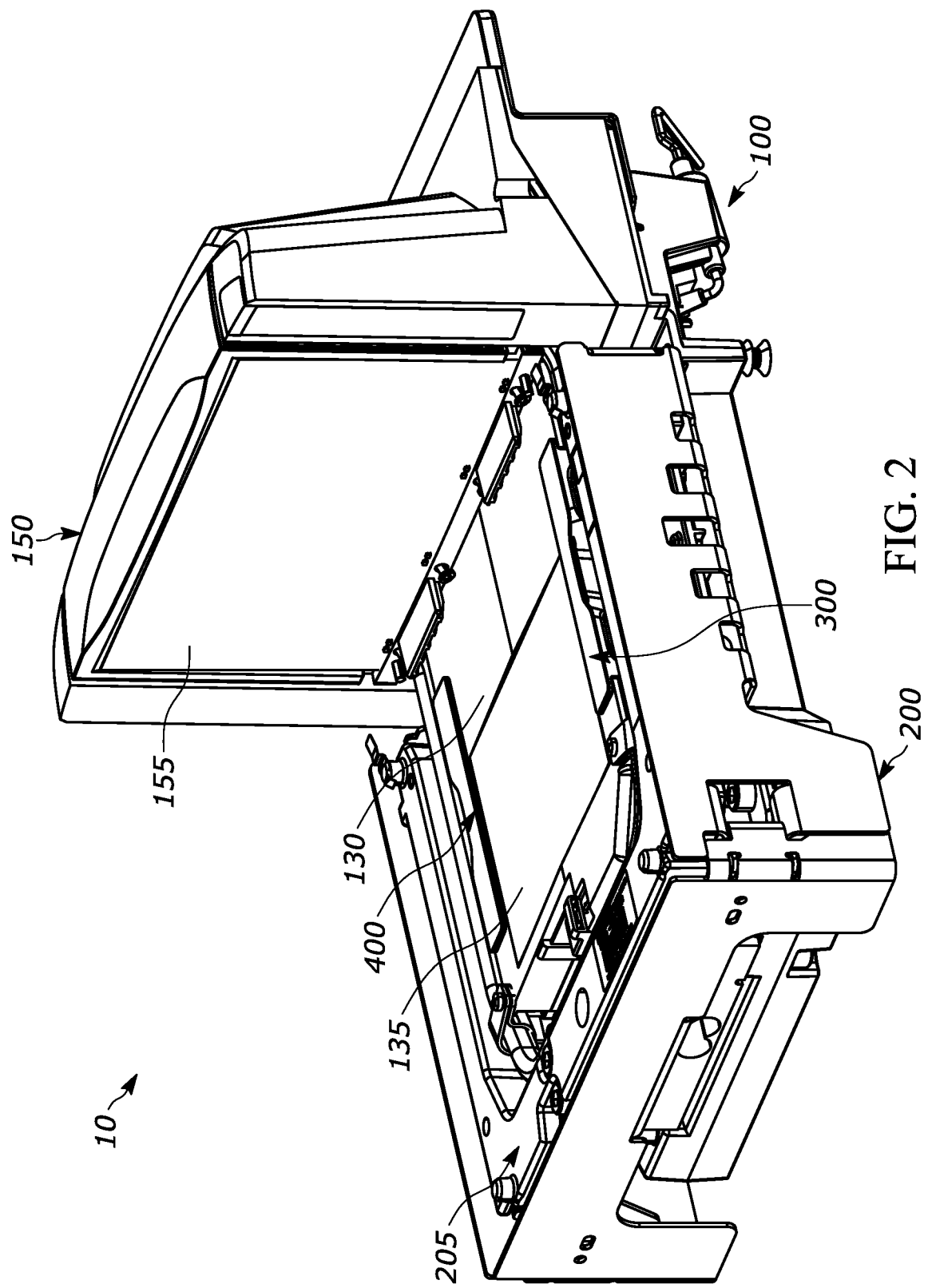
FIG. 2 illustrates a perspective view of the barcode reader assembly of FIG. 1 with the platter removed and the lift handles in the retracted position.
Figure 3:
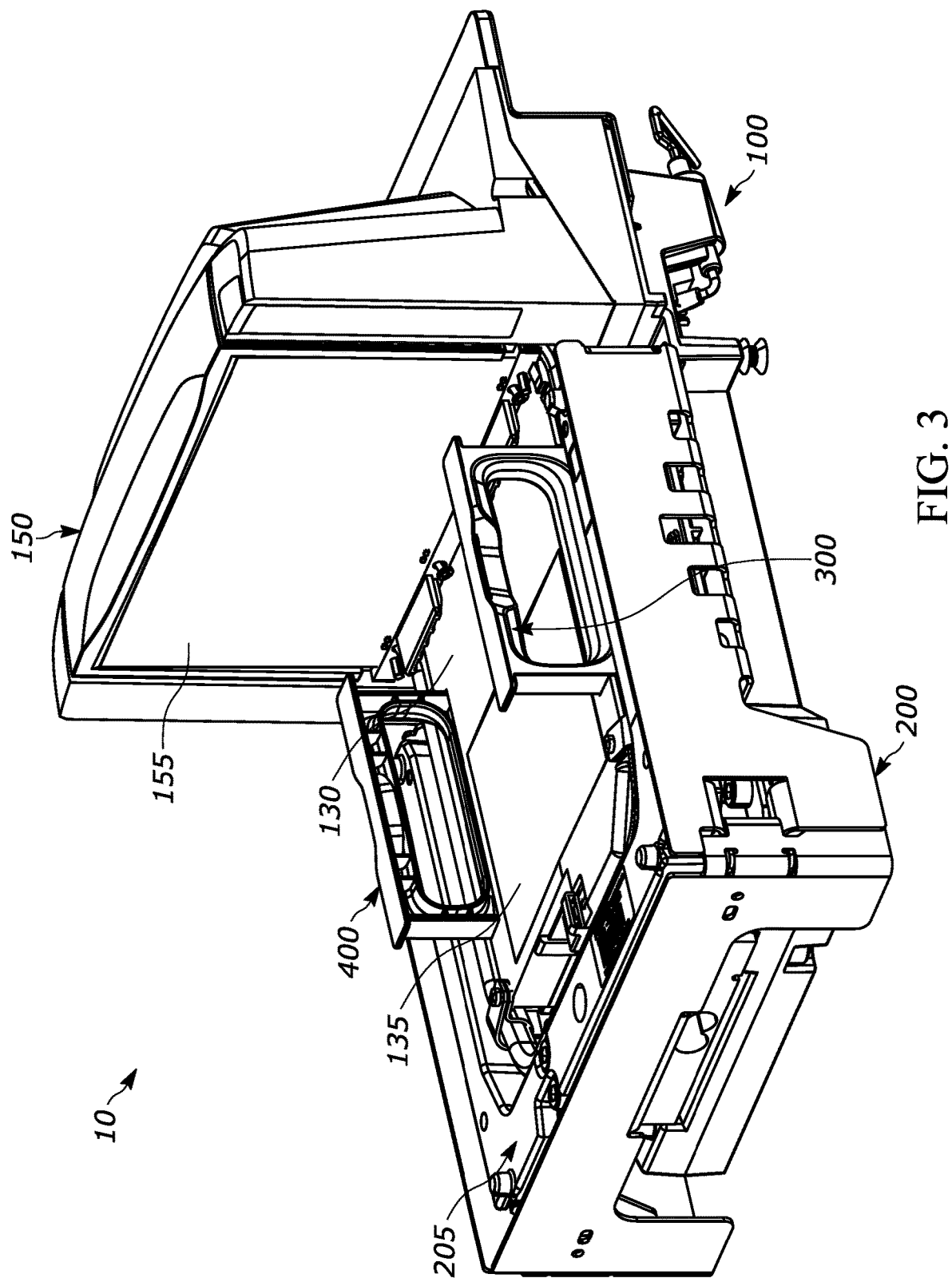
FIG. 3 illustrates a perspective view of the barcode reader assembly of FIG. 2 with the lift handles in the extended position.
Figure 4:
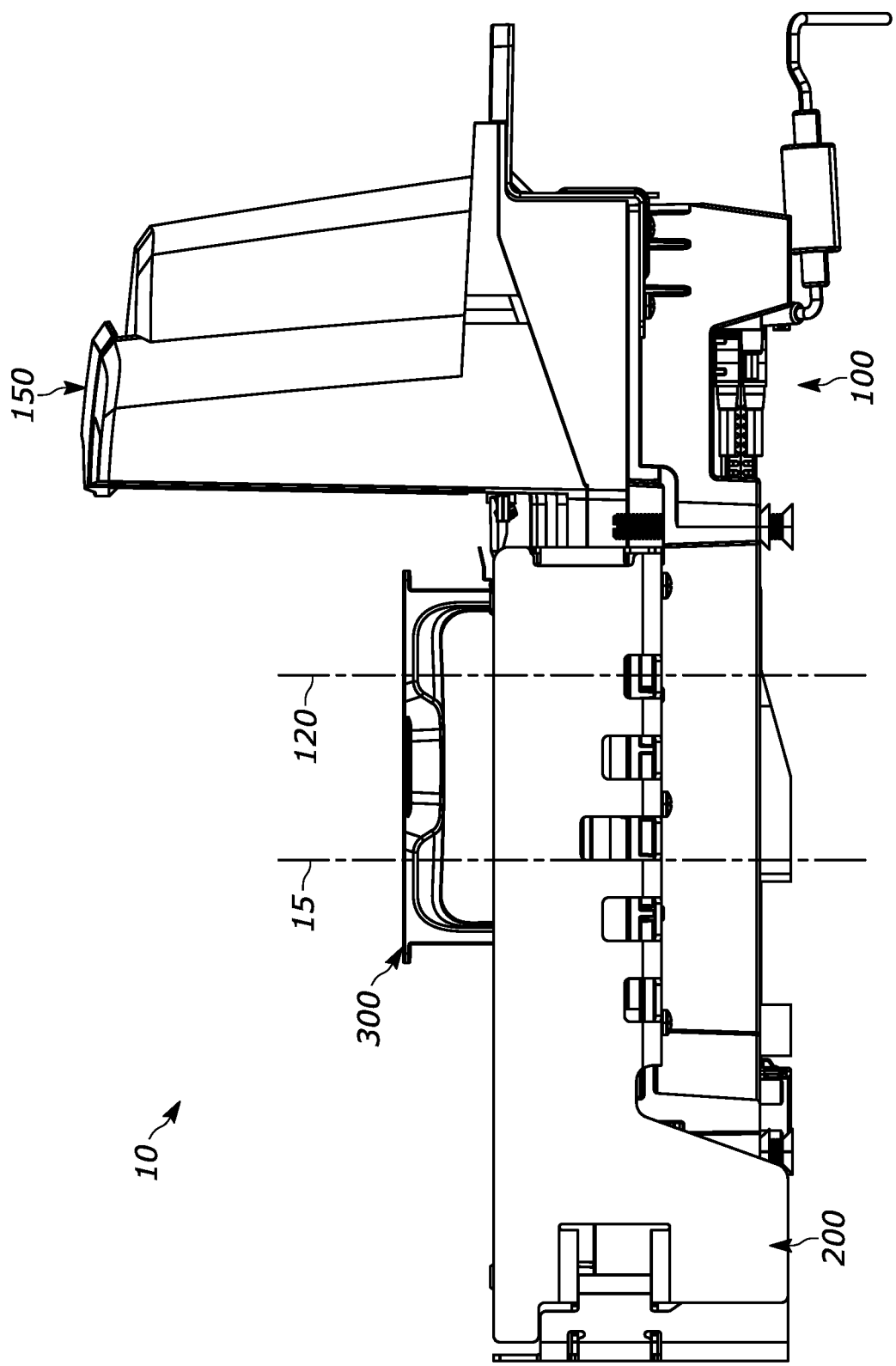
FIG. 4 illustrates a side view of the barcode reader assembly of FIG. 3.
Figure 5:
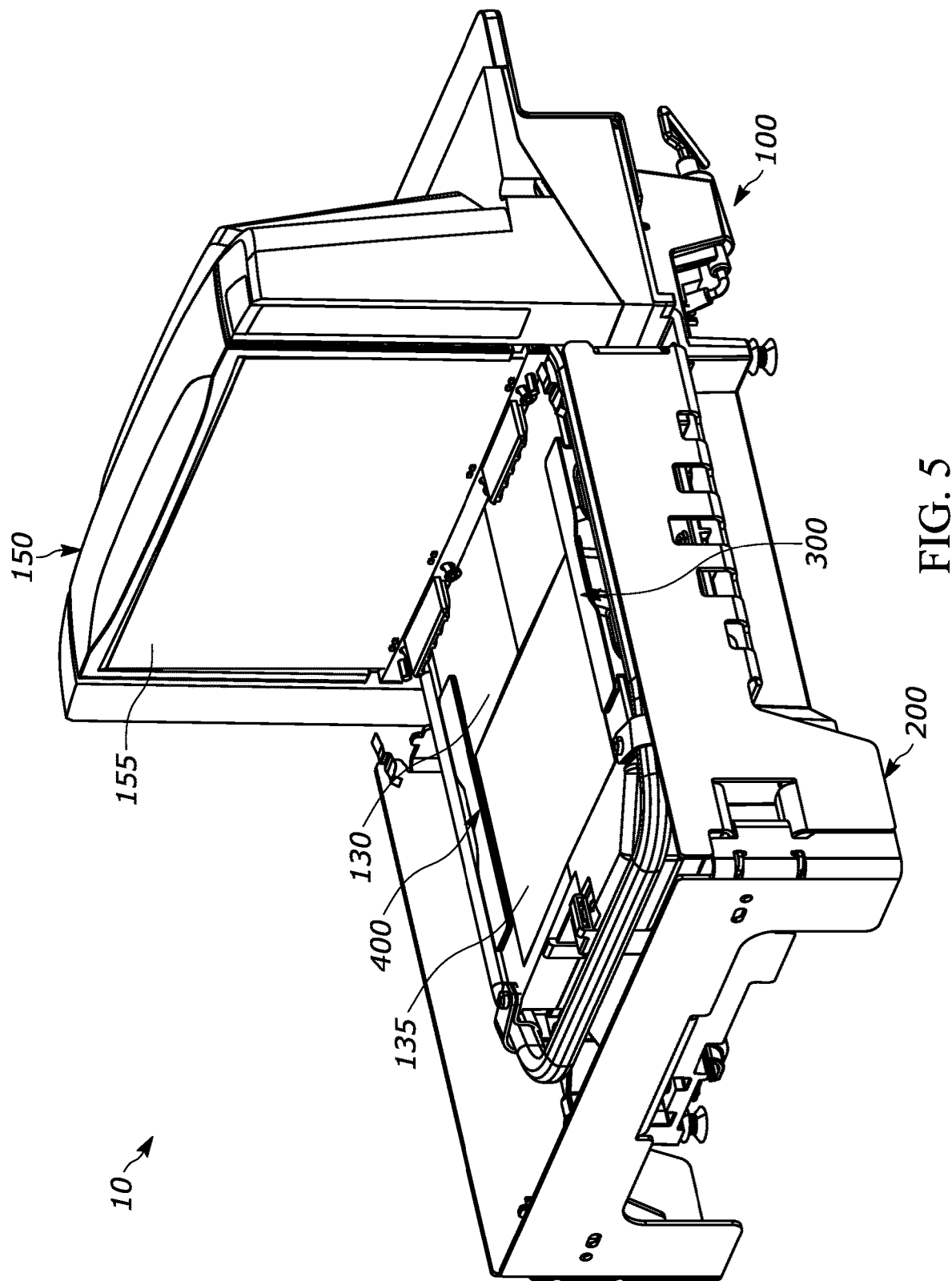
FIG. 5 illustrates a perspective view of the barcode reader assembly of FIG. 1 with the platter and scale assembly removed and the handles in the retracted position.
Figure 6:
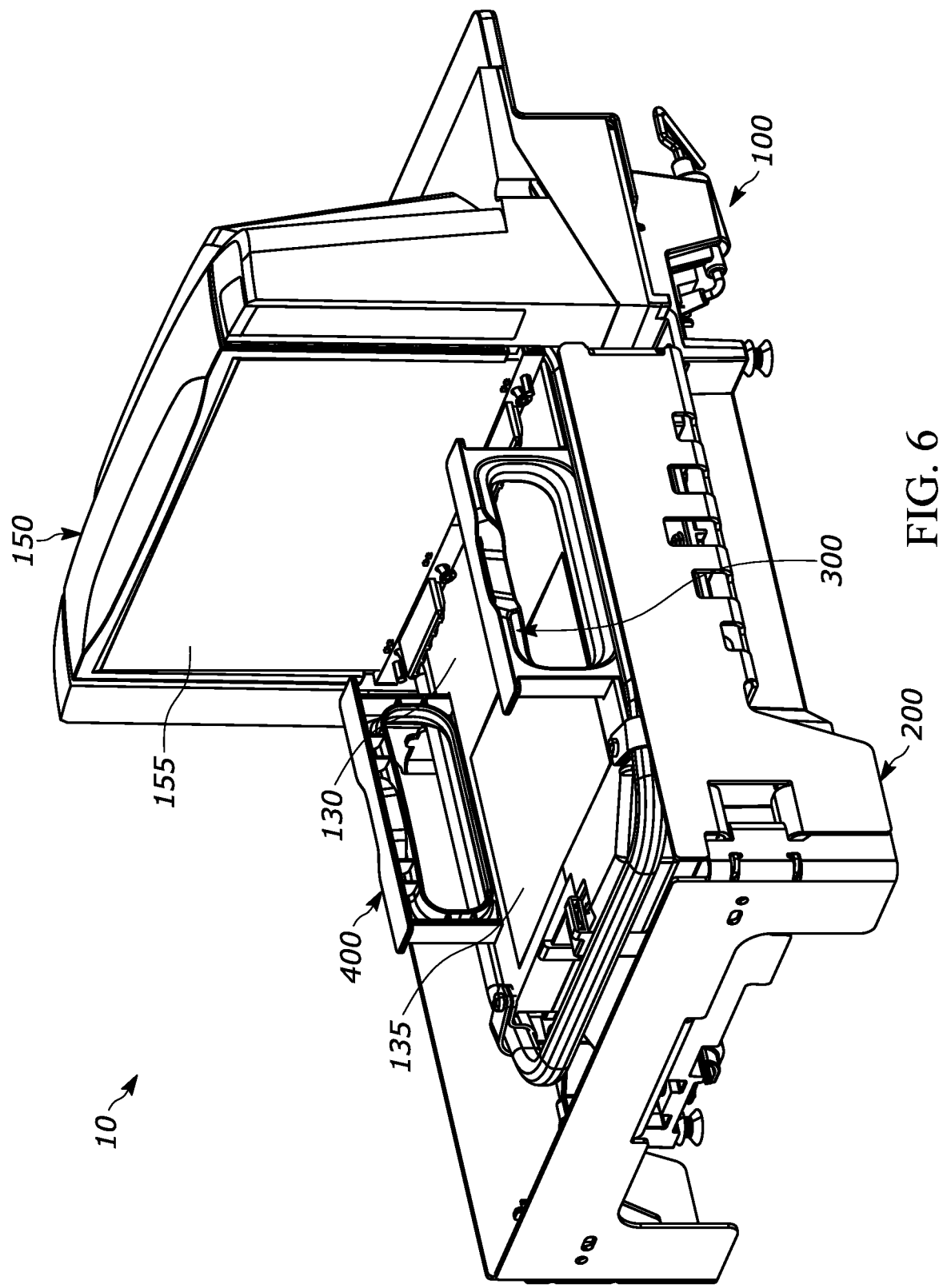
FIG. 6 illustrates a perspective view of the barcode reader assembly of FIG. 5 with the handles in the extended position.

Referring to FIGS. 1-6, an example barcode reader assembly 10 is shown. As can be seen in FIG. 5, barcode reader assembly 10 can generally include a barcode reader 100 and a metal frame 200, as shown in FIGS. 5-6, or barcode reader assembly 10 can include barcode reader 100, metal frame 200, and a scale assembly 205, as shown in FIGS. 2-3. A platter 210 can also be positioned over upper housing portion 150 of housing 105 of barcode reader 100 and over scale assembly 205, if used. Metal frame 200 can be secured to housing 105 of barcode reader 100 and can be a single, integral, unitary part or can include multiple parts that are assembled together, as shown. In addition, as best shown in FIGS. 2-3, when used as part of barcode reader assembly 10, scale assembly 205 is positioned between barcode reader 100 and metal frame 200 and can engage platter 210 to allow objects placed on platter 210 to be weighed by scale assembly 205.

Figure 7A:
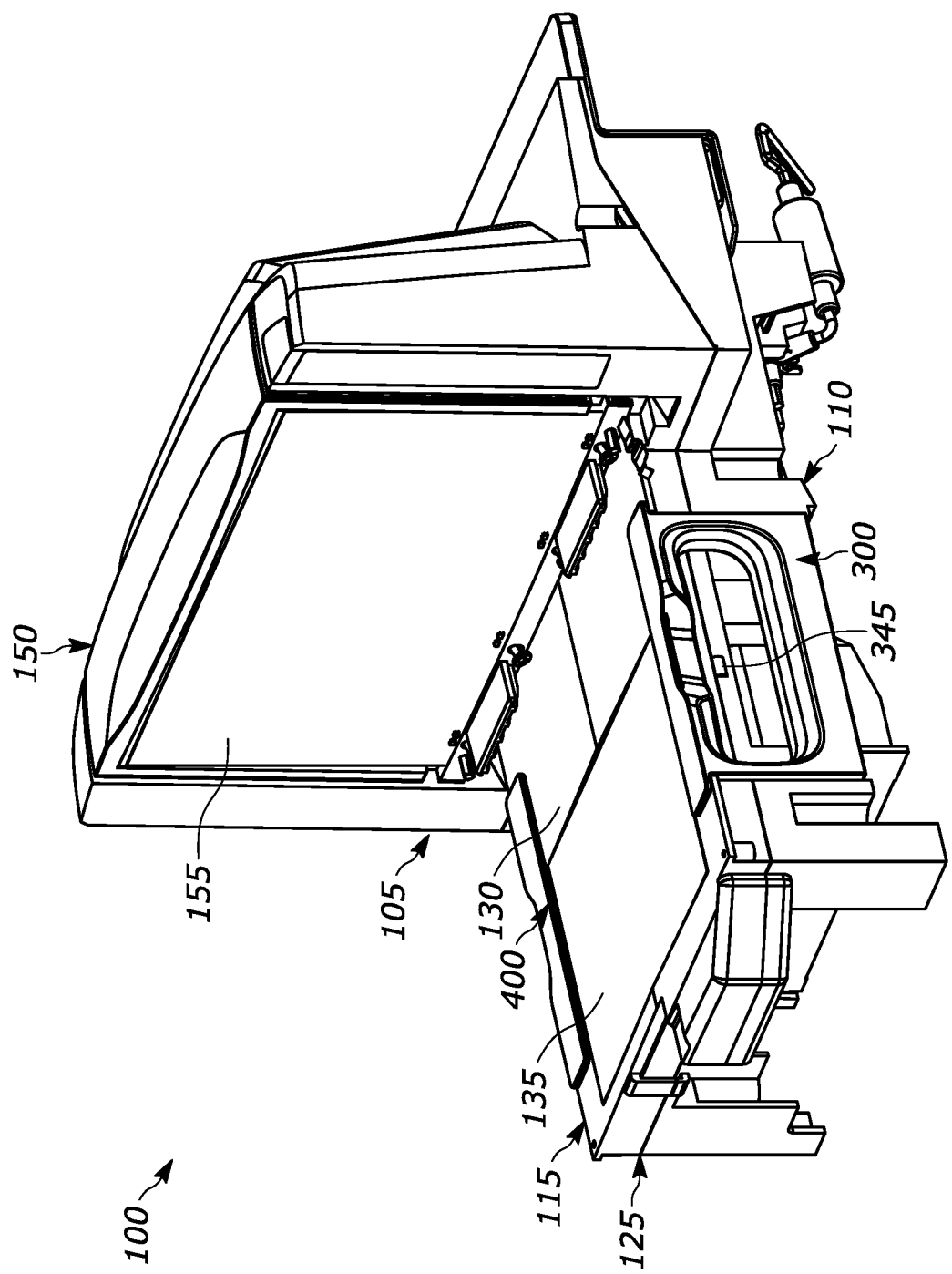
FIG. 7A illustrates a perspective view of an example barcode reader of the barcode reader assembly of FIG. 1 with the handles in the retracted position.
Figure 7B:
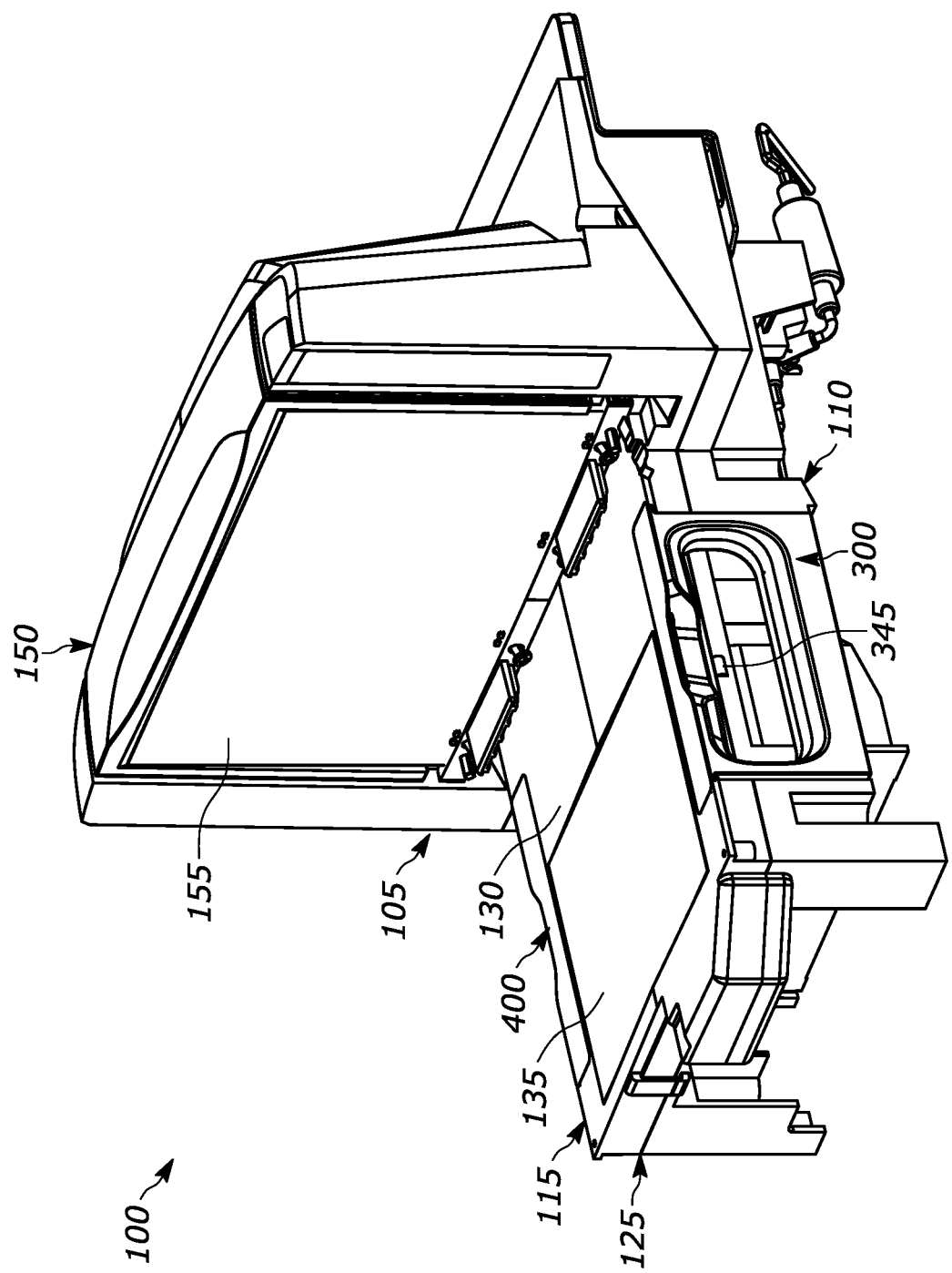
FIG. 7B illustrates the barcode reader of FIG. 7A with the top surfaces of the handles flush with the upper surface of the housing of the barcode reader.
Figure 8:
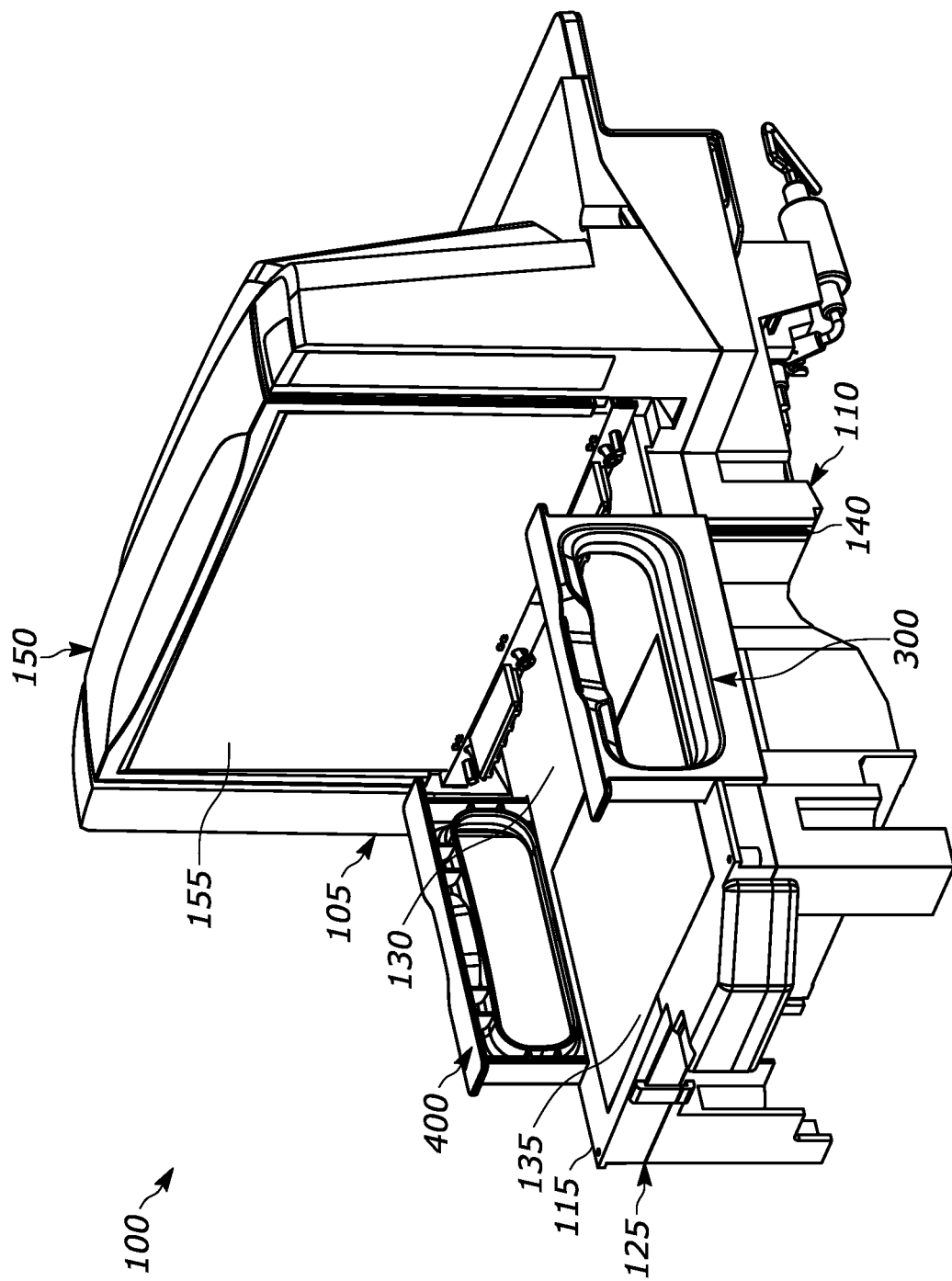
FIG. 8 illustrates a perspective view of the barcode reader of FIG. 7A with the handles in the extended position.

Referring to FIGS. 7A-8, barcode reader 100 in the example shown is a bioptic barcode reader. However, barcode reader 100 can be any type of barcode reader desired, such as a single window barcode reader. Barcode reader 100 generally includes housing 105, which includes a lower housing portion 125 and an upper housing portion 150 that extends above lower housing portion 125, a retractable first lift handle 300 positioned on a first side 110 of housing 105, and a retractable second lift handle 400 positioned on a second side 115 of housing 105, opposite first side 110. Upper housing portion 150 has a generally horizontal window 135 positioned at an upper surface 130 of upper housing portion 150 and a generally vertical window 155 positioned in upper housing portion 150. In the examples shown, first lift handle 300 and second lift handle 400 are movably attached to housing 105 without any additional parts, other than first lift handle 300, second lift handle 400, and housing 105, as described in more detail below.

Figure 11:
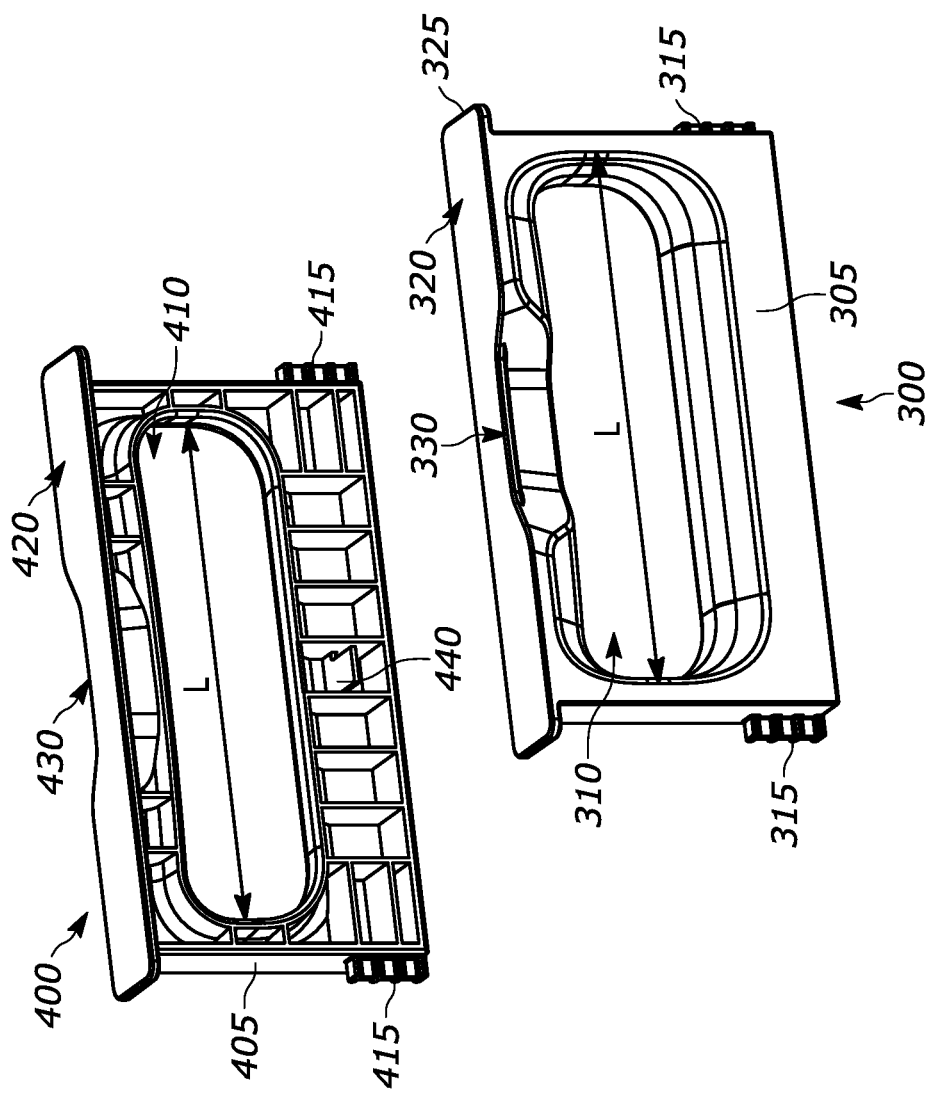
FIG. 11 illustrates a perspective view of the lift handles of the barcode reader of FIG. 7A.

First lift handle 300 and second lift handle 400 are mirror images of each other and are movable relative to housing 105 between a retracted position (FIGS. 2, 5, and 7A-B) and an extended position (FIGS. 3-4, 6, and 8). Referring to FIG. 11, first lift handle 300 and second lift handle 400 each have a main body 305, 405, which can be made from a molded plastic, formed wire, or another other material that is appropriate for a given application. An elongated first aperture 310 is formed through main body 305 of first lift handle 300 and an elongated second aperture 410 is formed through main body 405 of second lift handle 400. First and second apertures 310, 410 preferably have a length L of 80 millimeters and provide a large, secure grip surface that allows a full hand grip, rather than just a single finger like other known lift devices. In addition, as best seen in FIG. 4, first aperture 310 in first lift handle 300 and second aperture 410 in second lift handle 400 each overlie a first center of gravity 120 of barcode reader 100 so that barcode reader 100 can be lifted and moved by first and second lift handles 300, 400 and will be balanced as barcode reader is lifted. In addition, first and second apertures 310, 410 also each overlie a second center of gravity 15 of barcode reader assembly 10 (whether barcode reader assembly 10 includes barcode reader 100 and metal frame 200 (short, medium, or long metal frame) or includes barcode reader 100, metal frame 200, and scale assembly 205. Having first and second apertures 310, 410 overlie second center of gravity 15 of barcode reader assembly 10 allows barcode reader assembly 10 to be balanced when the entire barcode reader assembly 10 is being lifted or moved.

First and second lift handles 310, 410 can also each have a top lip 325, 425 that extends from the main body 305, 405. Top lips 325, 425 of first and second lift handles 300, 400 can be configured to overlap upper surface 130 of upper housing portion 150 when in the retracted position, as shown in FIG. 7A, which can prevent fluid, dirt, dust, and debris from entering housing 105 of barcode reader 100 between upper surface 130 and first and second lift handles 300, 400. Alternatively, as shown in FIG. 7B, top lips 325, 425 can be configured to fit within notches formed in upper surface 130 so that top surfaces 320, 420 of first and second lift handles 300, 400 are flush with upper surface 130 with first and second lift handles 300, 400 in the retracted position. An indent 330, 430 can also be formed in top lips 325, 425, which can be used to allow a user to fit a finger under top lips 325, 425 to lift first and second lift handles 300, 400 from the retracted position to the extended position.

Figure 9:
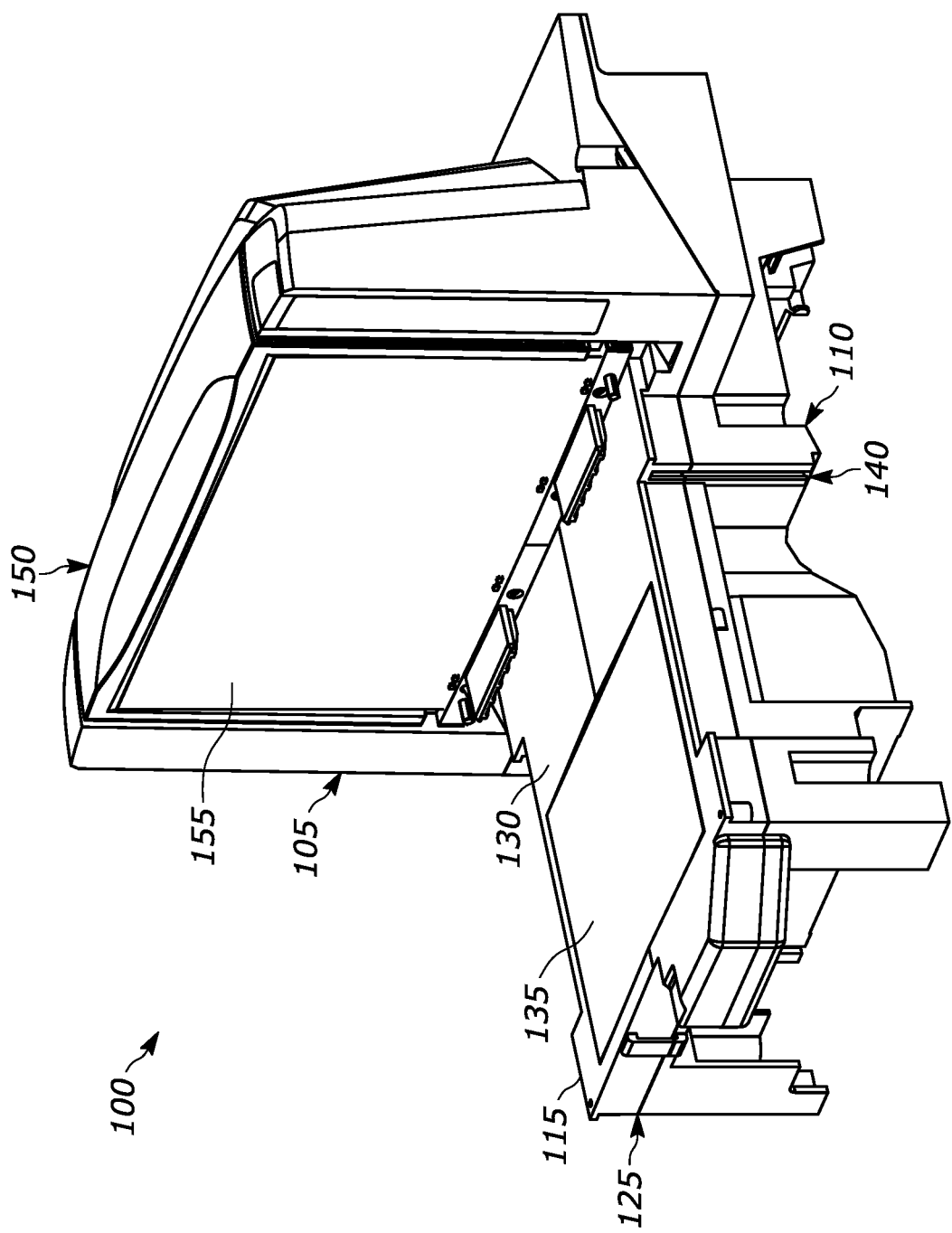
FIG. 9 illustrates a perspective view of a housing of the barcode reader of FIG. 7A.
Figure 10:
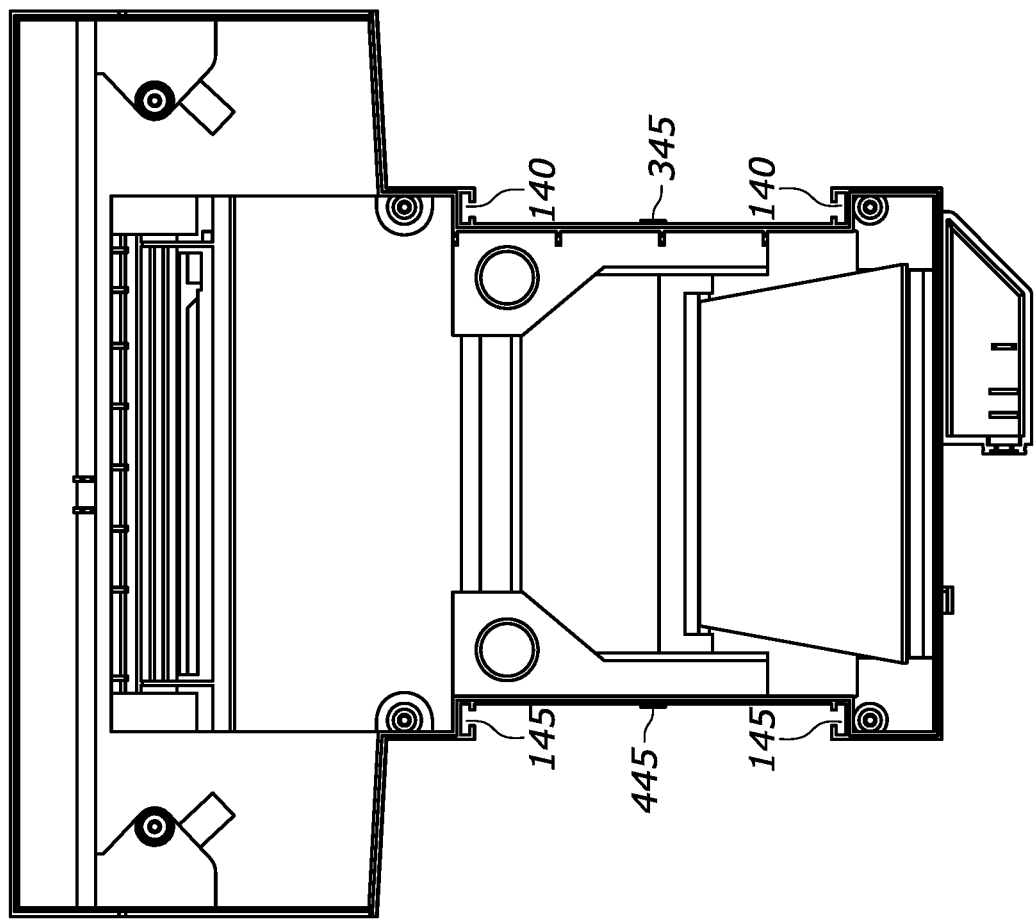
FIG. 10 illustrates a top view of the portion of the lower housing portion of FIG. 9.

First and second lift handles 300, 400 are movably attached to lower housing portion 125 such that first and second lift handles 300, 400 are movable in a linear motion (vertically) relative to housing 105. To provide this linear movement, first and second lift handles 300, 400 each have a pair of tabs 315, 415 and are received an move within first and second pairs of channels 140, 145 in housing 105. Referring to FIGS. 9-10, housing 105 includes first pair of channels 140 on first side 110 of housing 105 and a second pair of channels 145 on second side 115 of housing 105. As shown, first pair of channels 140 and second pair of channels 145 extend into upper housing portion 150 and into lower housing portion 125. However, first and second pairs of channels 140, 145 could extend only into lower housing portion 125 or only into upper housing portion 150, depending on the particular design of housing used. In addition, in the example shown, first and second pairs of channels 140, 145 extend all the way through the bottom of lower housing portion 125, which provides an opening at the bottom of first and second pairs of channels 140, 145 to allow fluid or debris that may enter first and second pairs of channels 140, 145 to move through and fall out of first and second pairs of channels 140, 145, rather than getting stuck in first and second pairs of channels 140, 145. Referring to FIG. 11, first lift handle 300 has tabs 315 that extend from main body 305 and extend into and are received in first pair of channels 140 in lower housing portion 125 so that first lift handle 300 is movable in a linear motion relative to housing 105 between the retracted and extended positions. Similarly, second lift handle 400 has tabs 415 that extend from main body 405 and extend into and are received in second pair of channels 145 in lower housing portion 125 so that second lift handle 400 is movable in a liner motion relative to housing 105 between the retracted and extended positions. As first and second lift handles 300, 400 are moved from the retracted to the extended position, tabs 315, 415 will ride within first and second pairs of channels 140, 145 and will stop when tabs 315, 415 engage the end of first and second pairs of channels 140, 145. This allows first and second lift handles 300, 400 to be movably attached to housing 105 without any additional parts.

Barcode reader 100 can also have a first and second retention features to maintain first and second lift handles 300, 400 in the extended position. In the example shown, first and second retention features include identical flexible tabs 440 formed on first and second lift handles 300, 400 (flexible tab on first lift handle 300 not shown) and first and second protrusions 345, 445 on lower housing portion 125 of housing 105. When moved from the retracted to the extended position, first and second lift handles 300, 400 are lifted vertically in a linear motion until tabs 440 flex and snap past protrusions 345, 445, which then engage the respective flexible tabs 440 with first and second lift handles 300, 400 in the extended position to retain first and second lift handles 300, 400 in the extended position. Conversely, to move first and second lift handles 300, 400 from the extended to the retracted positions, first and second lift handles 300, 400 are pushed downward in a linear motion until tabs 440 flex and snap past protrusions 345, 445. Alternatively, flexible tabs 440 could also be formed on housing 105 (rather than on first and second lift handles 300, 400) and first and second protrusions 345, 445 could be formed on first and second lift handles 300, 400 (rather than on housing 105) and still operate in the same manner.

First and second lift handles 300, 400 make it easier to lift and move barcode assembly 10, or even barcode reader 100 by itself, whether it be to remove barcode reader assembly 10 from a packing box, removing it from or placing it into a cavity in a counter, moving it from one location to another, or any other movement of barcode reader assembly 10. To move barcode reader assembly 10, or barcode reader 100, first and second lift handles 300, 400 are moved in a linear motion relative to housing 105 from the retracted to the extended position. First and second lift handles 300, 400 are then gripped via elongated apertures 310, 410 to lift or move barcode reader assembly 10 via first and second lift handles 300, 400. As described above, elongated apertures 310, 410 of first and second lift handles 300, 400 overlie a first center of gravity 120 of barcode reader 100 and a second center of gravity of barcode reader assembly 10, which includes barcode reader assembly 10 with any size metal frame 200 and with or without scale assembly 205. First and second lift handles 300, 400 can also be maintained in the extended position by first and second retention features, as discussed above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader assembly, comprising:
a barcode reader comprising a housing, a retractable first lift handle having an elongated first aperture positioned on a first side of the housing, and a retractable second lift handle having an elongated second aperture positioned on a second side of the housing, opposite the first side, each of the first lift handle and the second lift handle being movable relative to the housing between a retracted position and an extended position; and a metal frame secured to the housing of the barcode reader;

wherein the first aperture in the first lift handle and the second aperture in the second lift handle each overlie a first center of gravity of the barcode reader and a second center of gravity of the barcode reader assembly.

2. The barcode reader assembly of claim 1, comprising a scale assembly positioned between the barcode reader and the metal frame.

3. The barcode reader assembly of claim 1, wherein:
the barcode reader is a bioptic barcode reader;
the housing includes a lower housing portion and an upper housing portion extending above the lower housing portion;
the upper housing portion includes an upper surface, a generally horizontal window positioned at the upper surface, and a generally vertical window positioned in the upper housing portion; and
the first lift handle and the second lift handle are movably attached to the housing.

4. The barcode reader assembly of claim 3, wherein the first lift handle and the second lift handle are movably attached to the housing without any additional parts.

5. The barcode reader assembly of claim 3, wherein:
the housing includes a first pair of channels on the first side of the housing and a second pair of channels on the second side of the housing;
the first lift handle includes a pair of tabs that extend into the first pair of channels to allow linear movement of the first lift handle relative to the housing of the barcode reader; and
the second lift handle includes a pair of tabs that extend into the second pair of channels to allow linear movement of the second lift handle relative to the housing of the barcode reader.

6. The barcode reader assembly of claim 5, wherein the first pair of channels and the second pair channels extend into the upper housing portion and the lower housing portion.

7. The barcode reader assembly of claim 3, wherein the first lift handle has a top surface that is flush with the upper surface of the upper housing portion with the first lift handle in the retracted position and the second lift handle has a top surface that is flush with the upper surface of the upper housing portion with the second lift handle in the retracted position.

8. The barcode reader assembly of claim 1, wherein each of the first lift handle and the second lift handle includes a main body and a top lip that extends from the main body.

9. The barcode reader assembly of claim 8, wherein each of the first lift handle and the second lift handle includes an indent in the top lip.

10. The barcode reader assembly of claim 8, wherein the top lip of each of the first lift handle and the second lift handle overlaps an upper surface of the housing of the barcode reader.

11. The barcode reader assembly of claim 1, comprising a first retention feature configured to maintain the first lift handle in the extended position and a second retention feature configured to maintain the second lift handle in the extended position, the first retention feature comprising a flexible tab formed on one of the first lift handle or the housing of the barcode reader and a first protrusion on the other of the first lift handle or the housing of the barcode reader that engages the flexible tab with the first lift handle in the extended position, and the second retention feature comprising a flexible tab formed on one of the second lift handle or the housing of the barcode reader and a second protrusion on the other of the second lift handle or the housing of the barcode reader that engages the flexible tab with the second lift handle in the extended position.

12. A bioptic barcode reader, comprising:
a housing;
a retractable first lift handle having an elongated first aperture positioned on a first side of the housing, the first lift handle being movable in a linear motion relative to the housing between a retracted position and an extended position; and
a retractable second lift handle having an elongated second aperture positioned on a second side of the housing, opposite the first side, the second lift handle being movable in a linear motion relative to the housing between the retracted position and the extended position.

13. The bioptic barcode reader of claim 12, wherein:
the housing includes a lower housing portion and an upper housing portion extending above the lower housing portion;
the upper housing portion includes an upper surface, a generally horizontal window positioned at the upper surface, and a generally vertical window positioned in the upper housing portion; and
the first lift handle and the second lift handle are movably attached to the lower housing portion.

14. The bioptic barcode reader of claim 13, wherein the first lift handle and the second lift handle are movably attached to the housing without any additional parts.

15. The bioptic barcode reader of claim 13, wherein:
the housing includes a first pair of channels on the first side of the housing and a second pair of channels on the second side of the housing;
the first lift handle includes a pair of tabs that extend into the first pair of channels to allow linear movement of the first lift handle relative to the housing; and
the second lift handle includes a pair of tabs that extend into the second pair of channels to allow linear movement of the second lift handle relative to the housing.

16. The bioptic barcode reader of claim 15, wherein the first pair of channels and the second pair channels extend into the upper housing portion and the lower housing portion.

17. The bioptic barcode reader of claim 13, wherein the first lift handle has a top surface that is flush with the upper surface of the upper housing portion with the first lift handle in the retracted position and the second lift handle has a top surface that is flush with the upper surface of the upper housing portion with the second lift handle in the retracted position.

18. The bioptic barcode reader of claim 12, wherein each of the first lift handle and the second lift handle includes a main body and a top lip that extends from the main body.

19. The bioptic barcode reader of claim 18, wherein each of the first lift handle and the second lift handle includes an indent in the top lip.

20. The bioptic barcode reader assembly of claim 18, wherein the top lip of each of the first lift handle and the second lift handle overlaps an upper surface of the housing of the bioptic barcode reader.

21. The bioptic barcode reader assembly of claim 10, comprising a first retention feature configured to maintain the first lift handle in the extended position and a second retention feature configured to maintain the second lift handle in the extended position, the first retention feature comprising a flexible tab formed on one of the first lift handle or the housing and a first protrusion on the other of the first lift handle or the housing that engages the flexible tab with the first lift handle in the extended position, and the second retention feature comprising a flexible tab formed on one of the second lift handle or the housing and a second protrusion on the other of the second lift handle or the housing that engages the flexible tab of the second lift handle with the second lift handle in the extended position.

22. A method of moving a barcode reader assembly, comprising the steps of:
    moving a retractable first lift handle, positioned on a first side of a housing of a barcode reader of the barcode reader assembly, in a linear motion relative to the housing from a retracted position to an extended position;
    moving a retractable second lift handle, positioned on a second side of the housing of the barcode reader, opposite the first side, in a linear motion relative to the housing from the retracted position to the extended position;
    gripping the first lift handle via an elongated first aperture in the first lift handle and the second lift handle via an elongated second aperture in the second lift handle; and
    lifting the barcode reader assembly via the first lift handle and the second lift handle.

23. The method of claim 22, wherein the barcode reader assembly comprises a metal frame secured to the housing of the barcode reader and wherein the first aperture in the first lift handle and the second aperture in the second lift handle each overlie a first center of gravity of the barcode reader and a second center of gravity of the barcode reader assembly.

24. The method of claim 23, wherein the barcode reader assembly comprises a scale assembly positioned between the barcode reader and the metal frame.

25. The method of claim 22, comprising the step of maintaining the first lift handle and the second lift handle in the extended positions.

26. The method of claim 25, wherein:
    the first lift handle is maintained in the extended position by a first retention feature, the first retention feature comprising a flexible tab formed on one of the first lift handle or the housing and a first protrusion on the other of the first lift handle or the housing that engages the flexible tab with the first lift handle in the extended position; and
    the second lift handle is maintained in the extended position by a second retention feature, the second retention feature comprising a flexible tab formed on one of the second lift handle or the housing and a second protrusion on the other of the second lift handle or the housing that engages the flexible tab of the second lift handle with the second lift handle in the extended position.

\* \* \* \* \*